United States Patent
Tanaka (10) Patent No.: US 9,853,705 B2
(45) Date of Patent: Dec. 26, 2017

(54) COMMUNICATION SYSTEM, BASE STATION, MOBILE STATION, AND RECEPTION QUALITY DETERMINATION METHOD

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 14/929,984

(22) Filed: Nov. 2, 2015

(65) Prior Publication Data

US 2016/0056876 A1 Feb. 25, 2016

Related U.S. Application Data

(63) Continuation of application No. PCT/JP2013/063082, filed on May 9, 2013.

(51) Int. Cl.
*H04B 7/06* (2006.01)
*H04W 48/20* (2009.01)
(Continued)

(52) U.S. Cl.
CPC ........... *H04B 7/0617* (2013.01); *H04B 7/024* (2013.01); *H04B 7/0469* (2013.01); *H04B 7/0619* (2013.01); *H04B 7/0632* (2013.01); *H04W 48/20* (2013.01); *H04W 72/046* (2013.01); *H04W 72/085* (2013.01); *H04W 16/28* (2013.01); *H04W 88/08* (2013.01)

(58) Field of Classification Search
None
See application file for complete search history.

(56) References Cited

U.S. PATENT DOCUMENTS

2005/0043031 A1* 2/2005 Cho ..................... H04B 7/0413
455/450
2010/0296462 A1 11/2010 Taoka
(Continued)

FOREIGN PATENT DOCUMENTS

JP 2009-89191 A 4/2009
JP 2011-239369 A 11/2011
(Continued)

OTHER PUBLICATIONS

Extended European search report with the supplementary European search report and the European search opinion issued for corresponding European Patent Application No. 13883956.8 dated Jun. 9, 2016.
Notice of Preliminary Rejection issued by the Korean Intellectual Property Office for corresponding Korean Patent Application No. 10-2015-7031780, dated Mar. 3, 2017, with English translation.
Chao Shen et al., "Distributed Robust Multicell Coordinated Beamforming With Imperfect CSI:An ADMM Approach" IEEE Transactions on Signal Processing, vol. 60, No. 6, Jun. 2012, pp. 2988-3003.
Pengfei Xia et al., "MIMO OFDM with ST Coding and Beamforming Adapted to Partial CSI", 2003 Conference on Information Sciences and Systems, The Johns Hopkins University, Mar. 12-14, 2003.
(Continued)

*Primary Examiner* — Brian Roberts
(74) *Attorney, Agent, or Firm* — Myers Wolin, LLC (57) ABSTRACT

A communication system includes a base station including a plurality of antennas that separate from each other and a mobile station. The base station maps a plurality of reference signals separable from each other onto the antennas to transmit the mapped reference signals. The mobile station determines, using the received reference signals, reception quality in consideration of gain of beam-forming transmission performed by the base station with the antennas, and notifies the base station of the determined reception quality.

7 Claims, 7 Drawing Sheets

| MODE | RECEPTION QUALITY DETERMINATION METHOD |
|---|---|
| 0 | NORMAL (NON-BEAM-FORMING) |
| 1 | LARGEST EIGENVECTOR CALCULATION (THREE-DIMENSIONAL BEAM-FORMING) |
| 2 | AVERAGE COMPLEX CORRELATION VALUE CALCULATION (TWO-DIMENSIONAL BEAM-FORMING) |

(51) Int. Cl.
*H04B 7/024* (2017.01)
*H04B 7/04* (2017.01)
*H04W 72/04* (2009.01)
*H04W 72/08* (2009.01)
*H04W 16/28* (2009.01)
*H04W 88/08* (2009.01)

(56) References Cited

U.S. PATENT DOCUMENTS

| | | |
|---|---|---|
| 2011/0085536 A1 | 4/2011 | Taoka et al. |
| 2011/0206154 A1 | 8/2011 | Ding et al. |
| 2011/0249613 A1 | 10/2011 | Sun et al. |
| 2011/0317748 A1 | 12/2011 | Li et al. |
| 2012/0033571 A1 | 2/2012 | Shimezawa et al. |
| 2012/0046001 A1 | 2/2012 | Inoue et al. |
| 2012/0287875 A1 | 11/2012 | Kim et al. |
| 2013/0021925 A1 | 1/2013 | Yin et al. |
| 2013/0120191 A1* | 5/2013 | Zhang .................. H04B 7/0469 342/377 |
| 2013/0162476 A1* | 6/2013 | Thomas .................. H01Q 3/30 342/372 |

FOREIGN PATENT DOCUMENTS

| | | |
|---|---|---|
| JP | 2012-44408 A | 3/2012 |
| JP | 2012-135051 A | 7/2012 |
| WO | 2009/139383 A1 | 11/2009 |
| WO | 2010/061724 A1 | 6/2010 |
| WO | 2013/054683 A1 | 4/2013 |

OTHER PUBLICATIONS

International Search Report with Written Opinion of the International Searching Authority for corresponding International Patent Application No. PCT/JP2013/063082 dated Jul. 9, 2013, with an English translation.

Partial supplementary European search report issued for corresponding European Patent Application No. 13883956.8 dated Feb. 19, 2016.

Alcatel-Lucent Shanghai Bell et al., "Considerations on CSI feedback enhancements for high-priority antenna configurations", Agenda Item: 6.6.2.1, R1-112420, 3GPP TSG-RAN WG1 #66, Athens, Greece, Aug. 22-26, 2011.

Notice of Preliminary Rejection issued by the Korean Intellectual Property Office for corresponding Korean Patent Application No. 10-2015-7031780, dated May 31, 2017, with English translation.

3GPP TS 36.213 V8.8.0, 3rd Generation Partnership Project; Technical Specification Group Radio Access Network; Evolved Universal Terrestrial Radio Access (E-UTRA); Physical layer procedures (Release 8), Sep. 2009.

First Notification of Office Action issued by the State Intellectual Property Office of China for corresponding Chinese Patent Application No. 201380076302.0, dated Sep. 30, 2017, with an English translation.

\* cited by examiner

| MODE | RECEPTION QUALITY DETERMINATION METHOD |
|---|---|
| 0 | NORMAL (NON-BEAM-FORMING) |
| 1 | LARGEST EIGENVECTOR CALCULATION (THREE-DIMENSIONAL BEAM-FORMING) |
| 2 | AVERAGE COMPLEX CORRELATION VALUE CALCULATION (TWO-DIMENSIONAL BEAM-FORMING) |

COMMUNICATION SYSTEM, BASE STATION, MOBILE STATION, AND RECEPTION QUALITY DETERMINATION METHOD

CROSS-REFERENCE TO RELATED APPLICATION

This application is a continuation of International Application No. PCT/JP2013/063082, filed on May 9, 2013, the entire contents of which are incorporated herein by reference.

FIELD

The embodiments discussed herein are related to a communication system, a base station, a mobile station, and a reception quality determination method.

BACKGROUND

A "cooperative communication" technology in a plurality of cells is considered as a method for improving the reception quality of a mobile station at the edge of a cell in Long Term Evolution-Advanced (LTE-A) by the 3rd Generation Partnership Project (3GPP). The cooperative communication is a technique in which a plurality of points (base stations or antennas) cooperates with each other to communicate with one or more mobile stations. For example, the same data is transmitted from the points to a terminal in the cooperative communication in the downlink. The cooperative communication in the downlink increases the gain by the effect of spatial diversity. The increase improves the reception quality of a mobile station at the edge of a cell. The cooperative communication in LTE-A is referred to as Coordinated Multi-Point (CoMP) communication.

Herein, all of the cells around a mobile station are candidates for the cell of the cooperative communication (hereinafter, sometimes referred to merely as a "candidate cell"). Selecting a cell to be related to the cooperative communication (namely, a cooperative cell) from the candidate cells increases the number of processes for determination in the mobile station and the amount of information about the determination result from the mobile station to the base station. In light of the foregoing, a small number of cells are previously selected as the candidate cells. A method for selecting the candidate cells is that Reference Signal Received Power (RSRP) of the reference signal to be transmitted to the mobile station in each cell is used. In LTE-A Rel. 11, the candidate cells are selected with the RSRP determined with a Cell-specific Reference Signal (CRS) and sets of the selected candidate cells, namely, CoMP Resource Management (CRM) sets are formed.

Note that the "cell" is defined based on the "communication area" and "channel frequency" of a base station. The "communication area" can be the whole of the area that the radio waves transmitted from the base station reach (hereinafter, sometimes referred to as a "range area") or can be divided areas obtained by dividing the range area (so-called, sectors). The "channel frequency" is a unit of frequencies that the base station uses for the communication, and is defined based on the center frequency and the bandwidth.

Alternatively, it is considered for LTE-A Rel. 12 that three-dimensional beam-forming in which vertical beam-forming is added to horizontal beam-forming is used in transmission from a base station.

Related-art examples are described, for example, in Japanese Laid-open Patent Publication No. 2012-135051, in Chao Shen, Tsung-Hui Chang, Member, IEEE, Kun-Yu Wang, Zhengding Qiu, and Chong-Yung Chi, Senior Member, IEEE, "Distributed Robust Multicell Coordinated Beamforming With Imperfect CSI: An ADMM Approach", *IEEE TRANSACTIONS ON SIGNAL PROCESSING*, VOL. 60, NO. 6, June, 2012, and in Pengfei Xia, Shengli Zhou, and Georgios B. Giannakisl, Dept. of Electrical and Computer Engr., University of Minnesota 200 Union St. SE, Minneapolis, Minn. 55455, "MIMO OFDM with ST Coding and Beamforming Adapted to Partial CSI", 2003 *Conference on Information Sciences and Systems*, The Johns Hopkins University, Mar. 12-14, 2003.

When performing beam-forming transmission, the base station uses a plurality of antennas to form transmission beams to a mobile station. When the mobile station determines RSRP using a reference signal transmitted from one of the antennas, the RSRP is lower than the received power of the data signal transmitted by the beam-forming transmission. It is assumed that the beam-forming is used for the cooperative communication. In such a case, when the RSRP of a reference signal transmitted from one of the antennas is used to select a candidate cell, the candidate cell is selected based on the received power different from the received power when the data signal is actually transmitted. This adversely reduces the gain in the cooperative communication. The adverse reduction becomes further pronounced in three-dimensional beam-forming in comparison with in beam-forming in a horizontal direction or a vertical direction (namely, in two-dimensional beam-forming) because the gain is further increased in three-dimensional beam-forming.

SUMMARY

According to an aspect of an embodiment, a communication system includes a base station including a plurality of antennas that separate from each other and a mobile station. The base station maps a plurality of reference signals separable from each other onto the antennas to transmit the mapped reference signals. The mobile station determines, using the received reference signals, reception quality in consideration of gain of beam-forming transmission performed by the base station with the antennas, and notifies the base station of the determined reception quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments of the communication system, the base station, the mobile station, and the reception quality determination method that are disclosed herein will be described hereinafter with reference to the appended drawings. Note that the communication system, the base station, the mobile station, and the reception quality determination method that are disclosed herein are not limited to the embodiments. The configurations having the same functions will be put with the same reference signs and the overlapping descriptions will be omitted in the embodiments. Communication systems that are an LTE system and an LTE-A system will be described hereinafter as examples. However, the systems are not limited to the examples.

First Embodiment

<Outline of Communication System>

Figure 1:
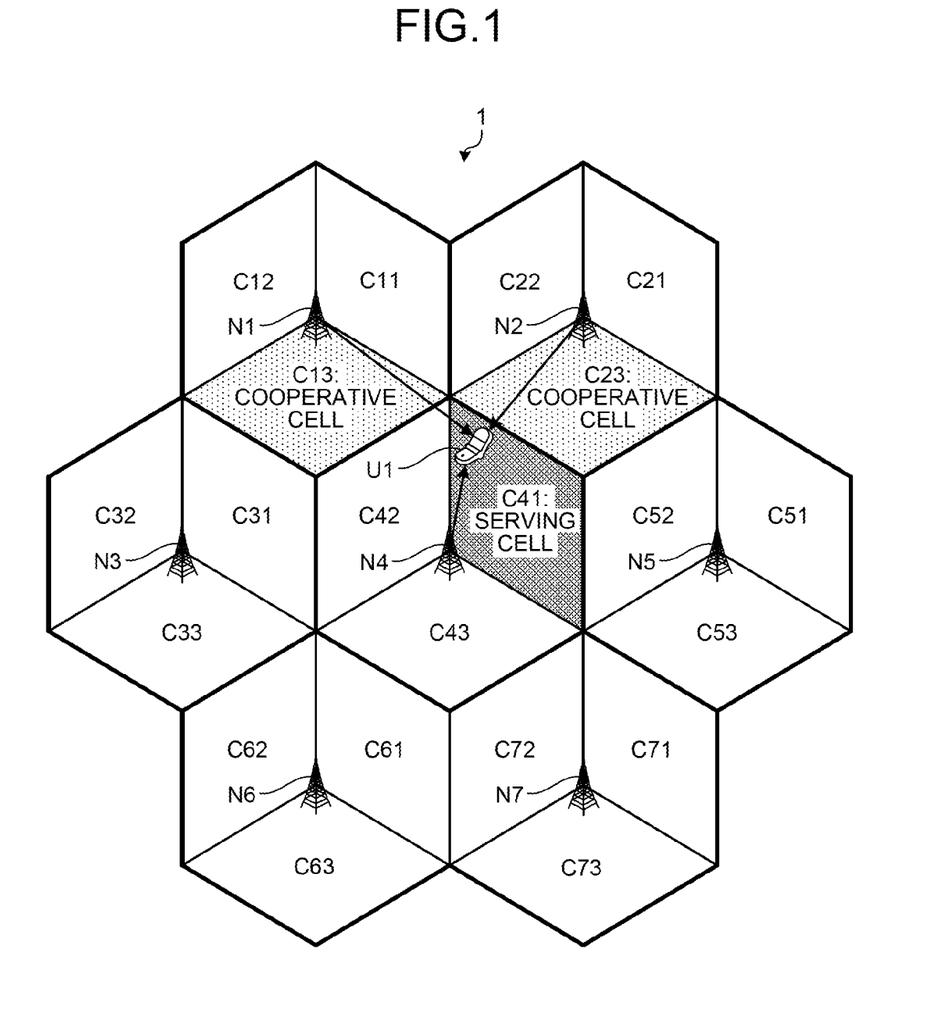
FIG. 1 is a diagram of an exemplary communication system according to a first embodiment.

FIG. 1 is a diagram of an exemplary communication system according to a first embodiment. FIG. 1 illustrates that a communication system 1 includes base stations N1 to N7, and a mobile station U1.

The base station N1 manages cells C11 to C13. Similarly, the base stations N2 to N7 manage cells C21 to C23, cells C31 to C33, cells C41 to C43, cells C51 to C53, cells C61 to C63, and cells C71 to C73, respectively.

In the example, the mobile station U1 is located at the edge of the cell C41, and the cell C41 works as a serving cell of the mobile station U1 (the cell in which the mobile station U1 is registered). FIG. 1 further illustrates that cooperative communication in the downlink is performed with respect to the mobile station U1, with the cell C13 and the cell C23 together with the cell C41 that is the serving cell of the mobile station U1. This means that the cell C13 and the cell C23 work as cooperative cells.

The base stations N1 to N7 are connected to each other through wired communication channels. The base stations N1 to N7 can be connected through an upper station or directly connected without an upper station. For example, the base stations N1 to N7 are directly connected to each other with an X2 interface.

<Exemplary Configuration of Base Station>

Figure 2:
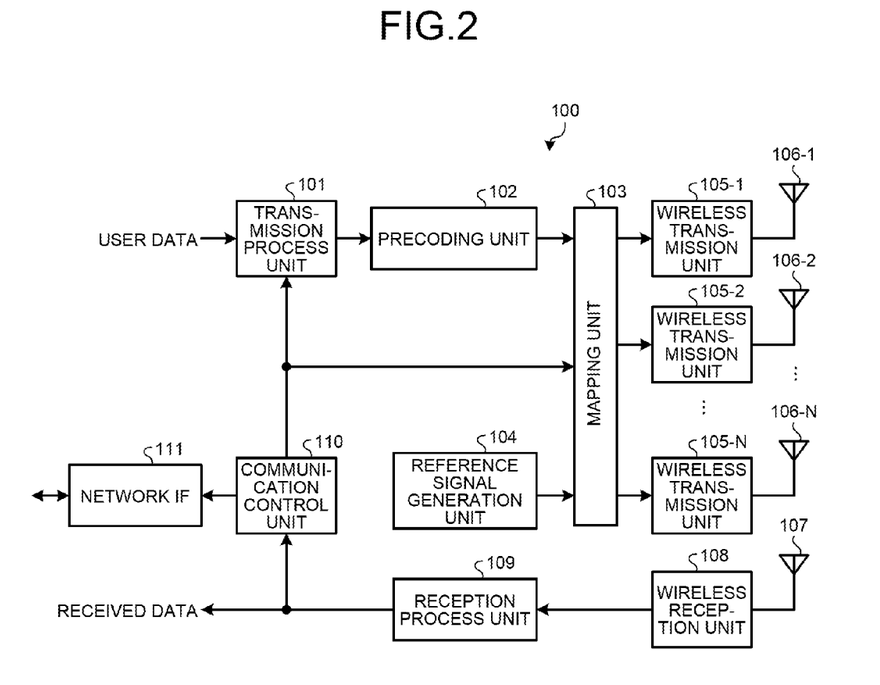
FIG. 2 is a block diagram of an exemplary base station according to the first embodiment.

FIG. 2 is a block diagram of an exemplary base station according to the first embodiment. FIG. 2 illustrates that a base station 100 includes a transmission process unit 101, a precoding unit 102, a mapping unit 103, a reference signal generation unit 104, wireless transmission units 105-1 to 105-N, and antennas 106-1 to 106-N. The antennas 106-1 to 106-N are placed separately from each other. The base station 100 further includes an antenna 107, a wireless reception unit 108, a reception process unit 109, a communication control unit 110, and a network interface (IF) 111.

The base station 100 corresponds to the base station N4 that manages the serving cell C41 illustrated in FIG. 1.

The transmission process unit 101 forms a baseband signal by processing the user data and the control data input from the communication control unit 110 in a predetermined transmission process. In other words, the transmission process unit 101, for example, codes or modulates the user data and the control data in order to form a baseband signal. Then, the transmission process unit 101 outputs the formed baseband signal to the precoding unit 102.

The precoding unit 102 multiplies the baseband signal by a precoding vector, and outputs the baseband signal multiplied by the precoding vector to the mapping unit 103. The multiplication by the precoding vector weights the beam-forming transmission on the baseband signal. Transmitting the signal weighted by the precoding vector from some of the antennas 106-1 to 106-N is the beam-forming transmission.

The reference signal generation unit 104 generates a plurality of reference signals perpendicular to each other as the reference signals separable from each other. The reference signal generation unit 104 then outputs the generated reference signals to the mapping unit 103. The reference signals are assigned to communication resources that are specific to each cell.

The mapping unit 103 maps the baseband signals multiplied by the precoding vector onto some of the antennas 106-1 to 106-N to be used for the beam-forming transmission. In other words, the mapping unit 103 outputs the baseband signals multiplied by the precoding vector to wireless transmission units corresponding to the antennas to be used for the beam-forming transmission among the wireless transmission units 105-1 to 105-N. The mapping unit 103 maps a plurality of reference signals onto some of the antennas 106-1 to 106-N, respectively, and outputs the reference signals to the wireless transmission units corresponding to the mapped antennas among the wireless transmission units 105-1 to 105-N. Note that the antennas used for the beam-forming transmission can be the same as the antennas for transmitting the reference signals, or can be different from the antennas for transmitting the reference signals.

Each of the wireless transmission units 105-1 to 105-N generates a wireless signal by processing the baseband signal and reference signal input from the mapping unit 103 in a predetermined wireless transmission process. In other words, each of the wireless transmission units 105-1 to 105-N, for example, performs a digital-analog conversion of the baseband signal and reference signal or up-converts the baseband signal and reference signal in order to generate a wireless signal. Then, the wireless transmission units 105-1 to 105-N transmit the formed wireless signals through the antennas 106-1 to 106-N.

The wireless reception unit 108 generates a baseband signal by processing the wireless signal received through the antenna 107 in a predetermined wireless reception process. In other words, the wireless reception unit 108 down-converts the wireless signal or performs an analog-digital conversion of the wireless signal in order to generate a baseband signal. Then, the wireless reception unit 108 outputs the formed baseband signal to the reception process unit 109.

The reception process unit 109 obtains received data by processing the baseband signal in a predetermined reception process. In other words, the reception process unit 109, for example, demodulates or decodes the baseband signal in order to obtain received data. Then, the reception process unit 109 outputs the obtained received data to the communication control unit 110 and a function unit on the downstream of the reception process unit 109. The received data includes the reception quality information notified from a mobile station 200 to be described below.

The communication control unit 110 extracts (obtains) the reception quality information from the received data. The reception quality information includes a cell identifier in order to indicate which cell is indicated in the reception quality information. Then, the communication control unit 110 selects the candidate cells based on the extracted (obtained) reception quality information. For example, the communication control unit 110 selects a predetermined number of cells as candidate cells in descending order of reception quality. The communication control unit 110 notifies the other base stations that manage the candidate cells of the results from the selection of the candidate cells, in other words, of the sets of the candidate cells through the network IF 111. The communication control unit 110 assigns the reference signal for each cell to the communication resource specific to each cell, and outputs, to the mapping unit 103, the assignment resource information indicating which communication resource the reference signal for each cell is assigned to. The mapping unit 103 maps the reference signals input from the reference signal generation unit 104 onto the communication resources in accordance with the assignment resource information. The communication control unit 110 outputs the assignment resource information as the control data to the transmission process unit 101 in order to notify the mobile station 200 to be described below of the assignment resource information. For example, a unit of communication resource is defined by a unit of time and a unit of frequency, and is sometimes referred to as a Resource Element (RE).

<Exemplary Configuration of Mobile Station>

Figure 3:
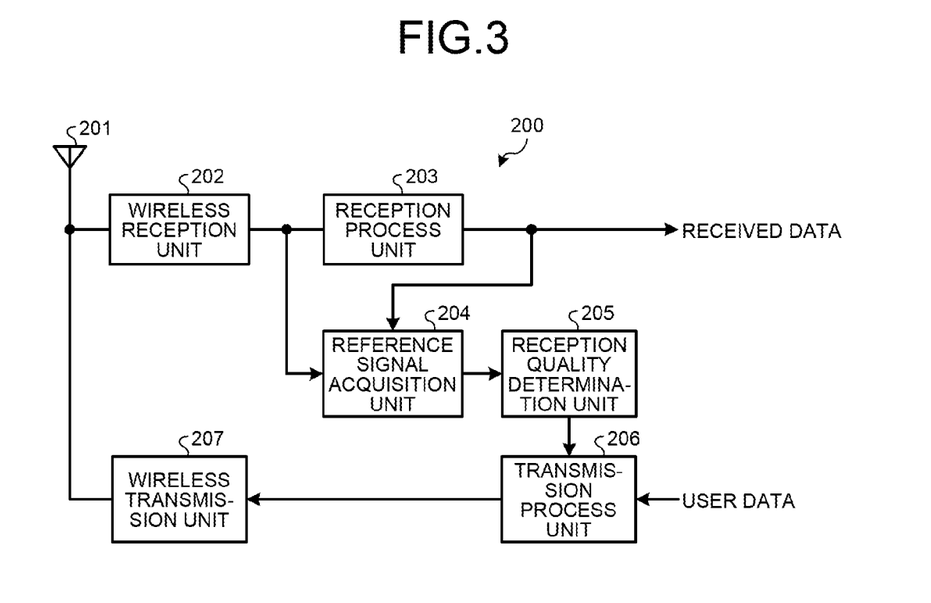
FIG. 3 is a block diagram of an exemplary mobile station according to the first embodiment.

FIG. 3 is a block diagram of an exemplary mobile station according to the first embodiment. FIG. 3 illustrates that the mobile station 200 includes an antenna 201, a wireless reception unit 202, a reception process unit 203, a reference signal acquisition unit 204, a reception quality determination unit 205, a transmission process unit 206, and a wireless transmission unit 207. The mobile station 200 corresponds to the mobile station U1 illustrated in FIG. 1.

The wireless reception unit 202 generates a baseband signal by processing the wireless signal received through the antenna 201 in a predetermined wireless reception process. In other words, the wireless reception unit 202, for example, down-converts the wireless signal or performs an analog-digital conversion of the wireless signal in order to generate a baseband signal. Then, the wireless reception unit 202 outputs the formed baseband signal to the reception process unit 203 and the reference signal acquisition unit 204.

The reception process unit 203 obtains received data by processing the baseband signal in a predetermined reception process. In other words, the reception process unit 203, for example, demodulates or decodes the baseband signal in order to obtain received data. Then, the reception process unit 203 outputs the obtained received data to the reference signal acquisition unit 204 and a function unit on the downstream of the reception process unit 203. The received data includes the assignment resource information notified from the base station 100.

The reference signal acquisition unit 204 extracts (obtains) the assignment resource information from the received data. Then, the reference signal acquisition unit 204 obtains the reference signals among the baseband signals in accordance with the extracted (obtained) assignment resource information, and outputs the obtained reference signals to the reception quality determination unit 205. As described above, the reference signal of each cell is assigned to the communication resource specific to each cell. Thus, the reference signal acquisition unit 204 can determine from the assignment resource information which cell the obtained reference signal is for. Subsequently, the reference signal acquisition unit 204 attaches a cell identifier to the obtained reference signal and outputs the reference signal to the reception quality determination unit 205.

The reception quality determination unit 205 determines the reception quality in consideration of the gain of the beam-forming transmission performed by the base station 100, using the reference signals input from the reference signal acquisition unit 204. The reception quality determination unit 205 outputs the reception quality information to the transmission process unit 206 in order to notify the base station 100 of the reception quality information including the determination result and the cell identifier. For example, the reception quality determination unit 205 determines the RSRP as the reception quality.

The transmission process unit 206 forms a baseband signal by processing the user data and the reception quality information input from the reception quality determination unit 205 in a predetermined transmission process. In other words, the transmission process unit 206, for example, codes or modulates the user data and the reception quality information in order to form a baseband signal. Then, the transmission process unit 206 outputs the formed baseband signal to the wireless transmission unit 207.

The wireless transmission unit 207 forms a wireless signal by processing the baseband signal in a predetermined wireless transmission process. In other words, the wireless transmission unit 207, for example, performs a digital-analog conversion of the baseband signal or up-converts the baseband signal in order to form a wireless signal. Then, the wireless transmission unit 207 transmits the formed wireless signal to the antenna 201. As a result, the reception quality information is notified to the base station 100.

<Exemplary Mapping of Reference Signals and Exemplary Determination of Reception Quality>

Figure 4:
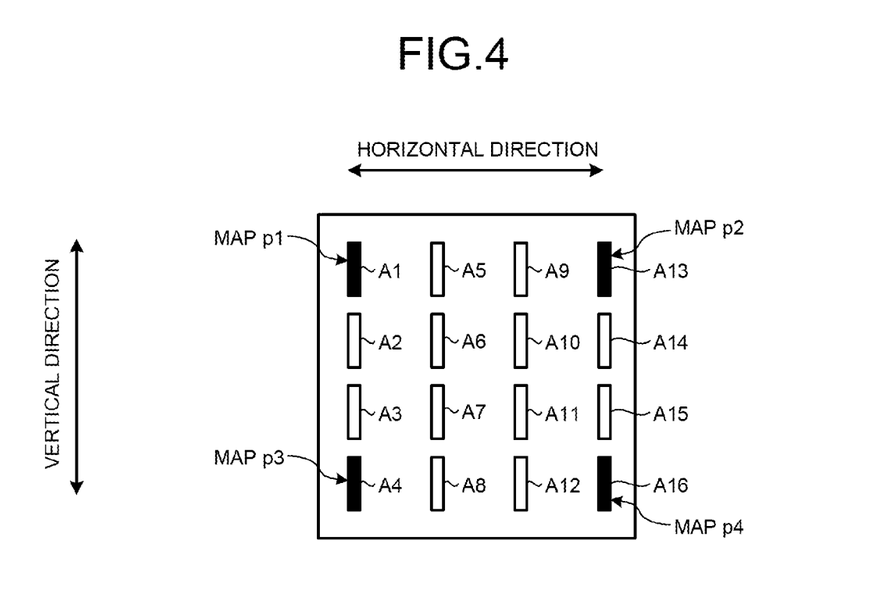
FIG. 4 is a diagram of exemplary mapping of reference signals according to the first embodiment.

FIG. 4 is a diagram of an exemplary mapping of reference signals according to the first embodiment. The antennas A1 to A16 in FIG. 4 correspond to the antennas 106-1 to 106-N of the base station 100. Thus, N=16 holds in the example. In other words, the base station 100 includes four antennas in a vertical direction and four antennas in a horizontal direction and the total number of antennas is 16, such that the base station 100 can perform three-dimensional beam-forming transmission to transmit the user data and the control data. In other words, the base station 100 can change the direction of beam in the vertical direction and in the horizontal direction. The reference signal generation unit 104 generates four reference signals p1, p2, p3, and p4 that are perpendicular to each other. For example, the reference signal generation unit 104 generates the four reference signals such that the perpendicular patterns of the reference signals are p1=(s, s, s, s), p2=(s, −s, s, −s), p3=(−s, −s, s, s), and p4=(s, −s, −s, s). The mapping unit 103 maps, for example, the reference signal p1 onto the antenna A1, the reference signal p2 onto the antenna A13, the reference signal p3 onto the antenna A4, and the reference signal p4 onto the antenna A16, respectively.

The mobile station 200 determines the reception quality as described below, using the reference signals p1 to p4 mapped as illustrated in FIG. 4.

The reception quality determination unit 205 calculates a channel estimation vector H^ indicated in an expression (1). In the expression (1), $h_1$^ indicates a channel estimation value based on the reference signal p1. Similarly, $h_2$^ to $h_4$^ indicate channel estimation values based on the reference signals p2 to p4, respectively. In other words, $h_1$^ to $h_4$^ correspond to the antennas A1, A13, A4, and A16 onto which the reference signals p1 to p4 are mapped, respectively.

$$\hat{H} = \begin{bmatrix} \hat{h}_1 \\ \hat{h}_2 \\ \hat{h}_3 \\ \hat{h}_4 \end{bmatrix}$$ Expression (1)

Next, the reception quality determination unit 205 calculates a channel correlation matrix R of the base station 100 in accordance with an expression (2). The channel correlation matrix R corresponds to the correlation matrix among the antennas A1, A13, A4, and A16. In the expression (2), $H^H$ indicates the Hermitian matrix of H^, "*" indicates the complex conjugation, and "< >" indicates the time average in a given time.

$$R = \langle \hat{H}\hat{H}^H \rangle = \begin{bmatrix} \langle |\hat{h}_1|^2 \rangle & \langle \hat{h}_1^*\hat{h}_2 \rangle & \langle \hat{h}_1^*\hat{h}_3 \rangle & \langle \hat{h}_1^*\hat{h}_4 \rangle \\ \langle \hat{h}_2^*\hat{h}_1 \rangle & \langle |\hat{h}_2|^2 \rangle & \langle \hat{h}_2^*\hat{h}_3 \rangle & \langle \hat{h}_2^*\hat{h}_4 \rangle \\ \langle \hat{h}_3^*\hat{h}_1 \rangle & \langle \hat{h}_3^*\hat{h}_2 \rangle & \langle |\hat{h}_3|^2 \rangle & \langle \hat{h}_3^*\hat{h}_4 \rangle \\ \langle \hat{h}_4^*\hat{h}_1 \rangle & \langle \hat{h}_4^*\hat{h}_2 \rangle & \langle \hat{h}_4^*\hat{h}_3 \rangle & \langle |\hat{h}_4|^2 \rangle \end{bmatrix}$$ Expression (2)

Next, the reception quality determination unit 205 calculates a weight vector W of the beam-forming in accordance with an expression (3). The calculation of the weight vector W corresponds to the estimation of the precoding vector used in the base station 100. In the expression (3), "eig(R)" indicates that the eigenvector corresponding to the largest fixed value in the matrix R (namely, the largest eigenvector) is calculated. In other words, W corresponding to the largest gain obtained from the three-dimensional beam-forming performed by the base station 100 is calculated with the expression (3).

$$W = eig(R)$$ Expression (3)

Then, the reception quality determination unit 205 calculates $P_{BF}$ that is RSRP in accordance with an expression (4). In the expression (4), $W^H$ indicates the Hermitian matrix of W.

$$P_{BF} = |W^H \hat{H}|^2 = \hat{H}^H W W^H \hat{H}$$ Expression (4)

As expressed in the expression (4), the expression for calculating $P_{BF}$ includes $WW^H$. The W is the weight vector W of the beam-forming. Thus, by calculating $P_{BF}$ in accordance with the expression (4), the reception quality determination unit 205 can determine the reception quality in consideration of the gain of the three-dimensional beam-forming transmission performed by the base station 100.

As described above in the first embodiment, the base station 100 maps a plurality of reference signals separable from each other onto a plurality of antennas that separate from each other and transmits the reference signals. The mobile station 200 determines the reception quality in consideration of the gain of the beam-forming transmission performed by the base station 100, using the received reference signals. Then, the mobile station 200 notifies the base station 100 of the reception quality. Thus, when the mobile station 200 determines the reception quality, the gain of the beam-forming transmission is taken into consideration. Accordingly, when the beam-forming is used for the cooperative communication, the reception quality optimum for selecting a candidate cell is determined. The reception quality in consideration of the gain of the beam-forming transmission is notified to the base station 100. Thus, without using the beam-forming transmission to transmit the reference signal, the base station 100 can select a candidate cell in accordance with the same reception quality as the reception quality when a data signal is actually transmitted. Thus, the base station 100 can select the optimal candidate cells, and thus can prevent the gain of the cooperative communication from decreasing.

In the first embodiment, the base station 100 maps a plurality of reference signals onto the antennas that separate from each other in a vertical direction and a horizontal direction. The mobile station 200 determines the reception quality in consideration of the gain of the three-dimensional beam-forming transmission. This enables the mobile station 200 to determine the reception quality optimum for selecting a candidate cell when the three-dimensional beam-forming is used for the cooperative communication.

Second Embodiment

<Exemplary Mapping of Reference Signals and Exemplary Determination of Reception Quality>

Figure 5:
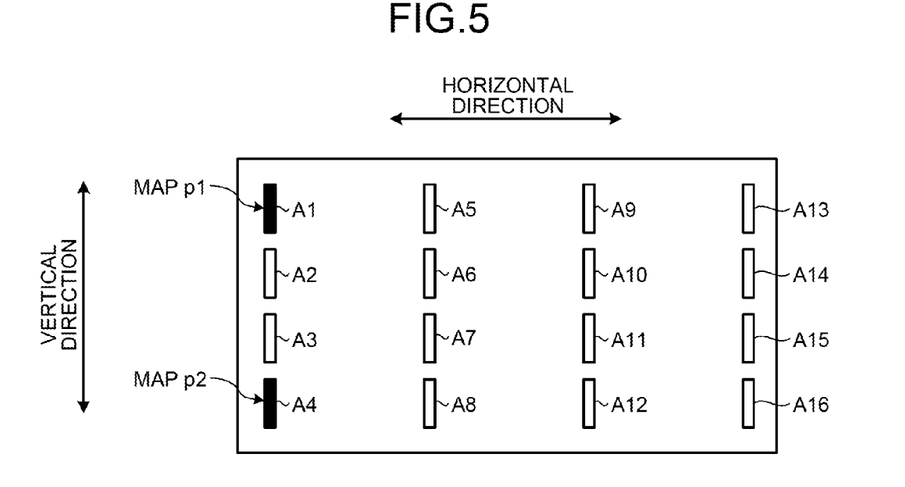
FIG. 5 is a diagram of exemplary mapping of reference signals according to a second embodiment.

FIG. 5 is a diagram of exemplary mapping of reference signals according to the second embodiment. The antennas A1 to A16 in In FIG. 5 correspond to the antennas 106-1 to 106-N of the base station 100. Thus, N=16 holds in the example. In other words, the base station 100 includes, for example, four antennas in a vertical direction and four antennas in a horizontal direction and the total number of antennas is 16. Wide horizontal intervals are set among the antennas such that the four antennas placed in the horizontal direction are non-correlated to each other. Thus, the user data and the control data can be transmitted with the two-dimensional beam-forming transmission in a vertical direction and with spatial multiplex transmission or diversity transmission by precoding in a horizontal direction. In other words, the base station 100 can change the beam direction only in the vertical direction. The reference signal generation unit 104 generates two reference signals p1 and p2 that are perpendicular to each other. For example, the reference signal generation unit 104 generates the reference signals such that the perpendicular patterns of the reference signals are p1=(s, s), and p2=(s, -s). The mapping unit 103 maps, for example, the reference signal p1 onto the antenna A1, and the reference signal p2 onto the antenna A4, respectively.

Figure 6:
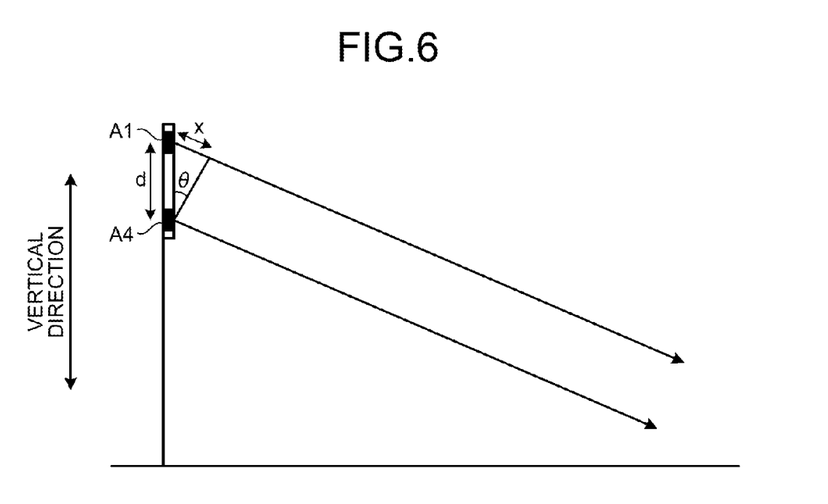
FIG. 6 is a diagram of exemplary arrangement of antennas according to the second embodiment.

The antenna A1 and the antenna A4 are relatively arranged as illustrated in FIG. 6. FIG. 6 is a diagram of an exemplary arrangement of antennas according to the second embodiment. In other words, the antenna A1 and the antenna A4 separate from each other at a distance d in a vertical direction. Thus, when the transmission beam is emitted in a direction inclined at an angle θ from the vertical direction, a delay time $t_2$ of the antenna A1 from the antenna A4, and a phase difference φ between the reference signals of the antenna A1 and the antenna A4 are expressed as an expression (5). In the expression (5), c indicates a speed of light, and f indicates a frequency.

$$t_2 = \frac{x}{c} = \frac{d\sin\theta}{c}$$
$$\phi = e^{j2\pi ft_2}$$
$$= e^{j2\pi f \frac{d\sin\theta}{c}}$$

Expression (5)

The mobile station 200 determines the reception quality as described below, using the reference signals p1 and p2 mapped as illustrated in FIG. 5.

Reference signals r1 and r2 obtained by the reference signal acquisition unit 204 are expressed as an expression (6). The reference signal r1 corresponds to the reference signal p1, and the reference signal r2 corresponds to the reference signal p2. In the expression (6), $h_1$ indicates a channel estimation value based on the reference signal p1, $h_2$ indicates a channel estimation value based on the reference signal p2, and $n_1$ and $n_2$ indicate a noise.

$$r_1 = h_1 + n_1$$
$$r_2 = h_2 + n_2 \cong h_1 e^{j\phi} + n_2$$

Expression (6)

The reception quality determination unit 205 calculates an average complex correlation value between r1 and r2 expressed in an expression (7). As expressed in the expression (7), the average complex correlation value can approximately be regarded as the phase difference between the reference signals p1 and p2. In other words, the phase difference between the reference signals p1 and p2 is estimated from the expression (7).

$$\frac{\langle r_1^* r_2 \rangle}{\langle |r_1| \rangle \langle |r_2| \rangle} = \frac{\langle (h_1 + n_1)^*(h_2 + n_2) \rangle}{\langle |r_1| \rangle \langle |r_2| \rangle}$$
$$\cong \frac{\langle (h_1^* + n_1^*)(h_1 e^{j\phi} + n_2) \rangle}{\langle |h_1| \rangle \langle |h_2| \rangle}$$
$$\cong \frac{\langle |h_1|^2 e^{j\phi} \rangle + \langle h_1^* n_2 \rangle + \langle n_1^*(h_1 e^{j\phi}) \rangle + \langle n_1^* n_2 \rangle}{\langle |h_1| \rangle \langle |h_2| \rangle}$$
$$\cong e^{j\phi} \equiv e^{j\hat{\phi}}$$

Expression (7)

Subsequently, the reception quality determination unit 205 calculates $P_{BF}$ that is RSRP in accordance with an expression (8). In other words, the reception quality determination unit 205 calculates $P_{BF}$ from the reference signals r1 and r2 obtained by the reference signal acquisition unit 204, and the average complex correlation value between r1 and r2.

$$P_{BF} = \|r_1 + r_2 e^{-j\hat{\phi}}\|^2$$
$$= \|(h_1 + n_1) + (h_1 e^{j\phi} + n_2) e^{-j\hat{\phi}}\|^2$$
$$= \|2h_1 + n_1 + n_2 e^{-j\hat{\phi}}\|^2$$

Expression (8)

The expression for calculating $P_{BF}$ includes the phase difference between the reference signals p1 and p2 as expressed in the expression (8). The phase difference corresponds to the average complex correlation value expressed in the expression (7). In other words, adding the noises that are non-correlated to each other reduces the noises and desired signals are added in phase in the expression (8). Thus, the reception quality determination unit 205 calculates $P_{BF}$ in accordance with the expression (8). This calculation enables the reception quality determination unit 205 to determine the reception quality in consideration of the gain of the two-dimensional beam-forming transmission performed by the base station 100 in a vertical direction.

As described above in the second embodiment, the base station 100 maps a plurality of reference signals onto a plurality of antennas that separate from each other in a vertical direction. The mobile station 200 determines the reception quality in consideration of the gain of the two-dimensional beam-forming transmission in the vertical direction. This enables to the mobile station 200 to determine the reception quality optimum for selecting a candidate cell when the two-dimensional beam-forming in the vertical direction is used for the cooperative communication.

Third Embodiment

<Exemplary Configuration of Base Station>

The exemplary configuration of the base station according to the third embodiment is similar to the configuration in the first embodiment. However, a communication control unit 110 performs a process to be described below in addition to the processes in the first embodiment. In other words, the communication control unit 110 outputs the information instructing a method for determining the reception quality of each cell (hereinafter, sometimes referred to as "determination method instruction information") together with the assignment resource information as the control data to the transmission process unit 101.

Figure 7:
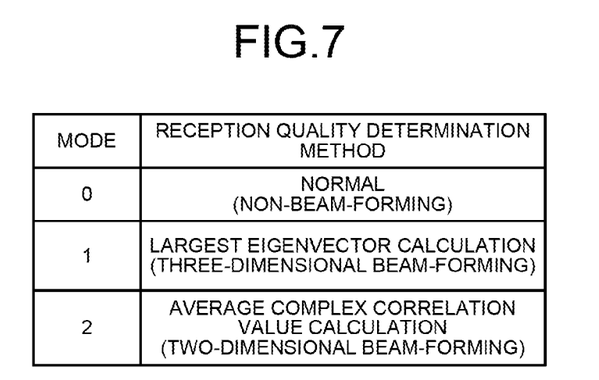
FIG. 7 is a diagram of exemplary reception quality determination modes according to a third embodiment.

For example, the communication control unit 110 selects one of modes 0, 1, and 2 illustrated in FIG. 7 for each cell as the determination method instruction information about the cell that the base station 100 manages and each of the candidate cells. FIG. 7 is a diagram of an exemplary reception quality determination mode according to the third embodiment. The mode 0 is selected when the beam-forming transmission is not performed, and instructs that RSRP be determined without considering the gain of the beam-forming in a conventional way. The mode 1 is selected when three-dimensional beam-forming transmission is performed, and instructs that RSRP be determined by calculating the largest eigenvector as described in the first embodiment. The mode 2 is selected when two-dimensional beam-forming transmission in a vertical direction is performed, and instructs that RSRP be determined by calculating the average complex correlation value as described in the second embodiment. In other words, the base station 100 selects any one of the modes 0 to 2 in accordance with the type of the beam-forming transmission. The modes can be determined in accordance with the arrangement of the transmission antennas in each cell.

<Exemplary Configuration of Mobile Station>

Figure 8:
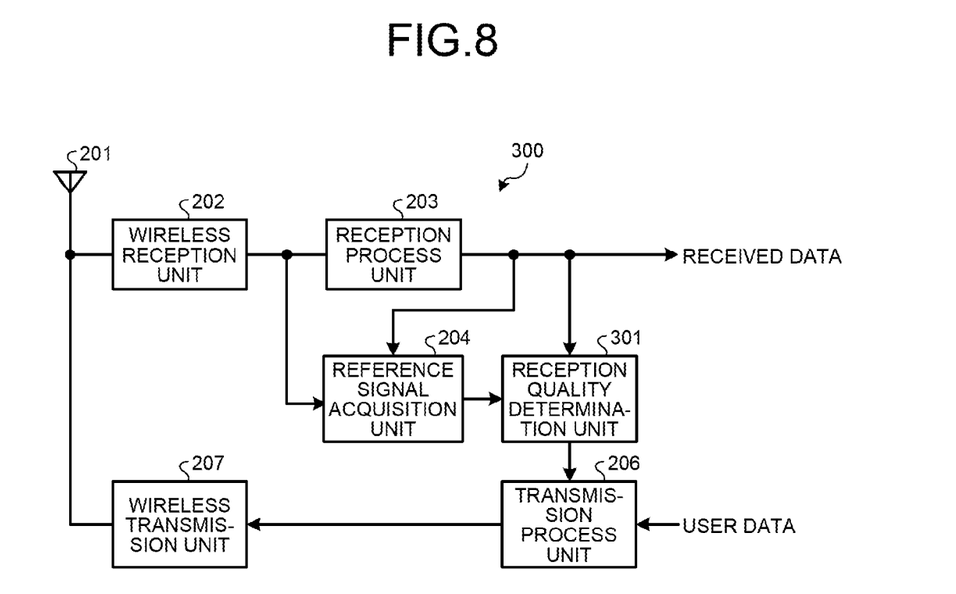
FIG. 8 is a block diagram of an exemplary mobile station according to the third embodiment.

FIG. 8 is a block diagram of an exemplary mobile station according to the third embodiment. FIG. 8 illustrates that a mobile station 300 includes a reception quality determination unit 301. The reception quality determination unit 301 extracts (obtains) the determination method instruction information about each cell from the received data, and switches the method for determining the reception quality in accordance with the extracted (obtained) determination method instruction information. In other words, the reception quality determination unit 301 determines RSRP without considering the gain of the beam-forming in a conventional way when the determination method instruction information is the mode 0. Alternatively, the reception quality determination unit 301 determines RSRP by calculating the largest eigenvector as described in the first embodiment when the determination method instruction information is the mode 1. Alternatively, the reception quality determination unit 301 determines RSRP by calculating the average complex correlation value as described in the second embodiment when the determination method instruction information is the mode 2. In other words, the mobile station 300 can determine the reception quality in an optimum determination method in accordance with the type of the beam-forming transmission performed by the base station 100.

As described above in the third embodiment, the base station 100 instructs a method for determining the reception quality to the mobile station 300 in accordance with the type of the beam-forming transmission. The mobile station 300 determines the reception quality in accordance with the determination method instructed by the base station 100. The mobile station 300 performs a smaller amount of process in the determination by the calculation of the average complex correlation value than the amount of process in the determination by the calculation of the largest eigenvector. The mobile station 300 performs an even smaller amount of process in the determination of RSRP without considering the gain of the beam-forming in a conventional way than the amount of process in the determination by the calculation of the average complex correlation value. Switching the method for determining the reception quality in accordance with the type of the beam-forming transmission can reduce the amount of process and power consumption by the mobile station 300.

Fourth Embodiment

<Exemplary Mapping of Reference Signals and Exemplary Determination of Reception Quality>

Figure 9:
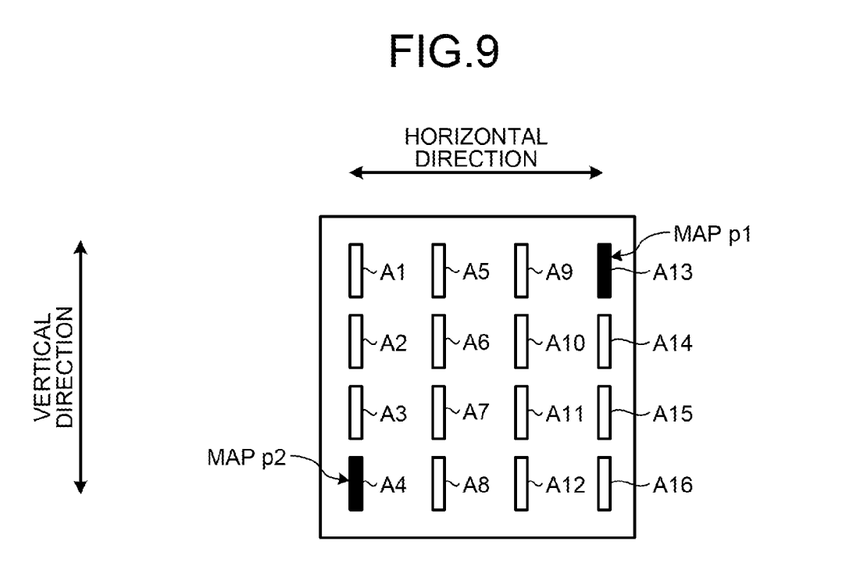
FIG. 9 is a diagram of exemplary mapping of reference signals according to a fourth embodiment.

FIG. 9 is a diagram of exemplary mapping of reference signals according to a fourth embodiment. The arrangement of antennas illustrated in FIG. 9 is identical to the arrangement illustrated in FIG. 4 (the first embodiment). However, the reference signal generation unit 104 according to the fourth embodiment generates two reference signals p1 and p2 that are perpendicular to each other. For example, the reference signal generation unit 104 generates the reference signals such that the perpendicular patters of the reference signals are p1=(s, s), and p2=(s, −s), respectively. The mapping unit 103 maps, for example, the reference signal p1 onto an antenna A13, and the reference signal p2 onto an antenna A4.

The mobile station 200 determines the reception quality as described below, using the reference signals p1 and p2 mapped as illustrated in FIG. 9.

Reference signals r1 and r2 obtained by a reference signal acquisition unit 204 are expressed as an expression (9). The reference signal r1 corresponds to the reference signal p1, and the reference signal r2 corresponds to the reference signal p2. In the expression (9), $h_{2,c}$ indicates the components correlated to $h_1$ among the channel estimation values based on the reference signal p2, and $h_{2,u}$ indicates the components non-correlated to $h_1$ among the channel estimation values based on the reference signal p2.

$$r_1 = h_1 + n_1 \qquad \text{Expression (9)}$$
$$r_2 = h_2 + n_2$$
$$= (h_{2,c} + h_{2,u}) + n_2$$
$$\cong (h_1 e^{j\phi} + h_{2,u}) + n_2$$

The reception quality determination unit 205 calculates an average complex correlation value between r1 and r2 expressed in an expression (10). As expressed in the expression (10), the average complex correlation value can approximately be regarded as the phase difference between the reference signals p1 and p2. In other words, the phase difference between the reference signals p1 and p2 is estimated from the expression (10).

$$\frac{\langle r_1^* r_2 \rangle}{\langle |r_1| \rangle \langle |r_2| \rangle} = \frac{\langle (h_1 + n_1)^* (h_2 + n_2) \rangle}{\langle |r_1| \rangle \langle |r_2| \rangle} \qquad \text{Expression (10)}$$
$$\cong \frac{\langle (h_1^* + n_1^*)((h_1 e^{j\phi} + h_{2,u}) + n_2) \rangle}{\langle |h_1| \rangle \langle |h_2| \rangle}$$
$$\cong \frac{\langle |h_1|^2 e^{j\phi} \rangle + \langle h_1^* h_{2,u} \rangle + \langle h_1^* h_2 \rangle + \langle n_1^* (h_1 e^{j\phi}) \rangle + \langle n_1^* h_{2,u} \rangle + \langle n_1^* n_2 \rangle}{\langle |h_1| \rangle \langle |h_2| \rangle}$$
$$\cong e^{j\phi} \equiv e^{j\tilde{\phi}}$$

The reception quality determination unit 205 subsequently calculates $P_{BF}$ that is RSRP in accordance with the expression (8), similarly to the second embodiment.

As described above in the fourth embodiment, RSRP can be determined by calculating the average complex correlation value, similarly to the second embodiment, even when the base station 100 performs the three-dimensional beam-forming transmission. This can further reduce the amount of process and power consumption for determining RSRP when the base station 100 performs the three-dimensional beam-forming transmission than the first embodiment (namely, the determination of RSRP by the calculation of the Largent eigenvector).

Other Embodiments

[1] The physical configurations of the base station 100 and the mobile stations 200 and 300 are not necessarily as illustrated in the drawings. In other words, a concrete aspect of the separation and incorporation of each unit is not limited to the aspects illustrated in the drawings. All or some of the units can functionally or physically be separated or incorporated in an arbitrary unit, for example, depending on various loads or usage conditions.

Various processing functions of the base station 100 and the mobile stations 200 and 300 can entirely or partially be performed on a Central Processing Unit (CPU) or a microcomputer such as a Micro Processing Unit (MPU) or a Micro Controller Unit (MCU). Alternatively, the processing functions can entirely or partially be performed on a program analyzed and executed by the CPU (or the microcomputer such as an MPU or an MCU), or on hardware by wired logic.

[2] The base station 100 and the mobile stations 200 and 300 can be implemented, for example, with the following hardware configuration.

Figure 10:
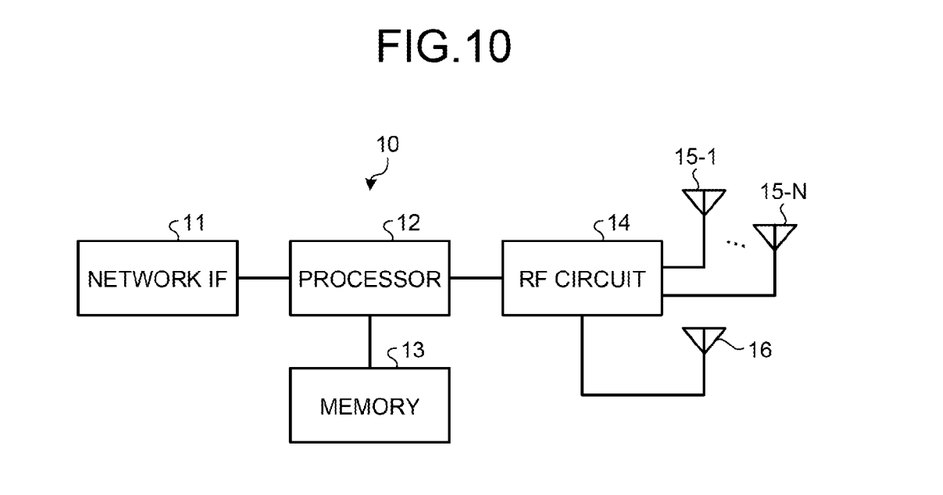
FIG. 10 is a diagram of an exemplary hardware configuration of the base station.

FIG. 10 is a diagram of an exemplary hardware configuration of the base station. As illustrated in FIG. 10, a base station 10 includes a network IF 11, a processor 12, a memory 13, a Radio Frequency (RF) circuit 14, and antennas 15-1 to 15-N. For example, a CPU, a Digital Signal Processor (DSP), or a Field Programmable Gate Array (FPGA) can be cited as an example of the processor 12. For example, a Random Access Memory (RAM) such as a Synchronous Dynamic Random Access Memory (SDRAM), a Read Only Memory (ROM), or a flash memory can be cited as an example of the memory 13.

By executing programs stored in various memories such as a non-volatile storage medium with the processor 12, various processing functions of the base station 100 can be implemented. In other words, programs corresponding to the processes performed by the transmission process unit 101, the precoding unit 102, the mapping unit 103, the reference signal generation unit 104, the reception process unit 109, and the communication control unit 110 can be stored in the memory 13, and each of the programs can be executed by the processor 12. The network IF 111 is implemented with the network IF 11. The wireless transmission units 105-1 to 105-N and the wireless reception unit 108 are implemented with the RF circuit 14. The antennas 106-1 to 106-N are implemented with the antennas 15-1 to 15-N. The antenna 107 is implemented with the antenna 16.

Figure 11:
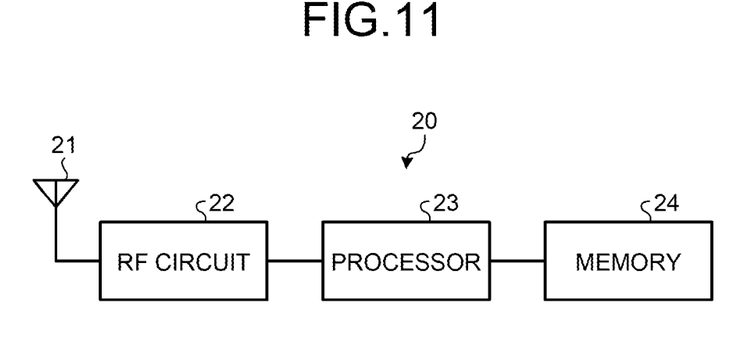
FIG. 11 is a diagram of an exemplary hardware configuration of the mobile station.

FIG. 11 is a diagram of an exemplary hardware configuration of the mobile station. As illustrated in FIG. 11, a mobile station 20 includes an antenna 21, an RF circuit 22, a processor 23, and a memory 24.

For example, a CPU, a DSP, or an FPGA is cited as an example of the processor 23. For example, a RAM such as an SDRAM, a ROM, or a flash memory can be cited as an example of the memory 24.

By executing programs stored in various memories such as a non-volatile storage medium with the processor 23, various processing functions of the mobile stations 200 and 300 can be implemented. In other words, programs corresponding to the processes performed by the reception process unit 203, the reference signal acquisition unit 204, the reception quality determination units 205 and 301, and the transmission process unit 206 can be stored in the memory 24, and each of the programs can be executed by the processor 23. The wireless reception unit 202 and the wireless transmission unit 207 are implemented with an RF circuit 22. The antenna 201 is implemented with the antenna 21.

[3] In the first to fourth embodiments, each of the antennas is described as a physical antenna. However, the disclosed technique can be applied to a logical antenna such as an antenna port as well.

According to one of the disclosed aspects, when beam-forming is used for cooperative communication, an optimal reception quality for selecting a candidate cell can be determined.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a base station including a plurality of antennas that are separate from each other; and
a mobile station, wherein
the base station maps a plurality of reference signals separable from each other onto the plurality of antennas to transmit the mapped reference signals, and
the mobile station determines, using the received reference signals, reception quality in consideration of gain of beam-forming transmission performed by the base station with the plurality of antennas, and notifies the base station of the determined reception quality, wherein
the base station instructs the mobile station of a method for determining the reception quality in accordance with a type of the beam-forming transmission.

2. The communication system according to claim 1, wherein
the plurality of antennas are separate from each other in a vertical direction and a horizontal direction, and
the mobile station determines the reception quality in consideration of the gain of the beam-forming transmission in which a beam direction is changeable both in the vertical direction and in the horizontal direction.

3. The communication system according to claim 1, wherein
the plurality of antennas are separate from each other in a vertical direction, and
the mobile station determines the reception quality in consideration of the gain of the beam-forming transmission in which a beam direction is changeable in the vertical direction.

4. The communication system according to claim 1, wherein
the base station selects a candidate cell for cooperative communication in accordance with the reception quality notified from the mobile station.

5. A base station comprising:
a plurality of antennas that are separate from each other;
a memory;
a processor that is coupled to the memory and that executes a process, the process comprising mapping a plurality of reference signals separable from each other onto the plurality of antennas and selecting a candidate cell for cooperative communication in accordance with reception quality notified from a mobile station; and
a radio frequency circuit that transmits the mapped reference signals through the antennas and receives notification about the reception quality in consideration of gain of beam-forming transmission performed with the plurality of antennas from the mobile station, the reception quality being determined by the mobile station with the reference signals,
wherein
the process comprises instructing the mobile station of a method for determining the reception quality in accordance with a type of the beam-forming transmission.

6. A mobile station that communicates with a base station including a plurality of antennas that are separate from each other, the mobile station comprising:
a radio frequency circuit that receives a plurality of reference signals, the reference signals being mapped onto the plurality of antennas and being separable from each other;

a memory; and a processor that is coupled to the memory and that executes a process, the process comprising determining reception quality in consideration of gain of beam-forming transmission performed by the base station with the plurality of antennas, using the received reference signals, and notifying the base station of the determined reception quality, wherein the radio frequency circuit receives an instruction of a method for determining the reception quality in accordance with a type of the beam-forming transmission.

7. A reception quality determination method comprising:

receiving a plurality of reference signals, the reference signals being mapped onto a plurality of antennas and being separable from each other, the antennas separating from each other and being included in a base station; and determining reception quality in consideration of gain of beam-forming transmission performed by the base station with the plurality of antennas, using the received reference signals, wherein the receiving includes receiving an instruction of a method for determining the reception quality in accordance with a type of the beam-forming transmission performed by the base station with the plurality of antennas.

* * * * *